US010034573B2

(12) United States Patent
Flick et al.

(10) Patent No.: US 10,034,573 B2
(45) Date of Patent: Jul. 31, 2018

(54) CAPSULE PROCESSING UNIT OF BEVERAGE PREPARATION MACHINE

(71) Applicant: Nestec S. A., Vevey (CH)

(72) Inventors: Jean-Marc Flick, Pomy (CH); Antoine Ryser, Lausanne (CH); Milena Partzch, Châtel-St-Denis (CH)

(73) Assignee: Nestec S. A., Vevey (CH)

( * ) Notice: Subject to any disclaimer, the term of this patent is extended or adjusted under 35 U.S.C. 154(b) by 0 days.

(21) Appl. No.: 15/315,649

(22) PCT Filed: Jul. 7, 2015

(86) PCT No.: PCT/EP2015/065415
§ 371 (c)(1),
(2) Date: Dec. 1, 2016

(87) PCT Pub. No.: WO2016/005352
PCT Pub. Date: Jan. 14, 2016

(65) Prior Publication Data
US 2017/0196397 A1    Jul. 13, 2017

(30) Foreign Application Priority Data
Jul. 9, 2014  (EP) .................................. 14176243

(51) Int. Cl.
*A47J 31/44* (2006.01)
*A47J 31/36* (2006.01)

(52) U.S. Cl.
CPC ....... *A47J 31/4492* (2013.01); *A47J 31/3623* (2013.01)

(58) Field of Classification Search
CPC .......................... A47J 31/4492; A47J 31/3623

USPC .......... 99/275, 279, 280, 282, 295; 426/112, 426/115
See application file for complete search history.

(56) References Cited

U.S. PATENT DOCUMENTS

| 2004/0112222 A1* | 6/2004 | Fischer | A47J 31/3628 |
| | | | 99/279 |
| 2004/0237793 A1* | 12/2004 | Zurcher | A47J 31/3642 |
| | | | 99/275 |
| 2012/0295234 A1* | 11/2012 | Rognon | A47J 31/3623 |
| | | | 434/127 |

FOREIGN PATENT DOCUMENTS

| EP | 2345351 A1 | 7/2011 |
| EP | 2594171 A1 | 5/2013 |
| WO | 2012123440 A1 | 9/2012 |

OTHER PUBLICATIONS

International Search Report, dated Oct. 2, 2015, in PCT/EP2015/065415, filed Jul. 7, 2015.
Written Opinion of the International Searching Authority, dated Oct. 2, 2015, in PCT/EP2015/065415, filed Jul. 7, 2015.

* cited by examiner

*Primary Examiner* — Thien S Tran
(74) *Attorney, Agent, or Firm* — Dunlap Codding, P.C.

(57) ABSTRACT

Capsule processing units of a beverage preparation machine are disclosed, as well as beverage preparation machines containing same. Also disclosed are methods of processing a capsule with the capsule processing unit. The capsule processing unit includes a code reading system, a capsule transfer mechanism, and an actuator unit.

12 Claims, 8 Drawing Sheets

CAPSULE PROCESSING UNIT OF BEVERAGE PREPARATION MACHINE

CROSS REFERENCE TO RELATED APPLICATIONS/INCORPORATION BY REFERENCE STATEMENT

This application is a US national stage application filed under 35 USC § 371 of International Application No. PCT/EP2015/065415, filed Jul. 7, 2015; which claims priority to Application No. EP 14176243.5, filed Jul. 9, 2014. The entire contents of each of the above-referenced applications are hereby expressly incorporated herein by reference.

TECHNICAL FIELD

The presently disclosed and/or claimed inventive concept(s) relates to a system for the preparation of a beverage, the system comprising a beverage preparation machine and a capsule, wherein the beverage preparation machine comprises an extraction unit to extract an ingredient of the beverage from the capsule during preparation of the beverage. More particularly, the presently disclosed and/or claimed inventive concept(s) relates to a capsule processing unit of such a beverage preparation machine. The capsule processing unit is operable to transfer the capsule to the extraction unit and to read a code of the capsule, wherein the code encodes extraction information, such as an operational parameter relating to the capsule, which is decoded and used by the machine during extraction.

BACKGROUND

Increasingly machines for the preparation of a beverage are configured to operate using a capsule that comprises a dosage of an ingredient of the beverage, for instance, coffee, tea or soup. During preparation an extraction unit of the machine at least partially extracts the ingredient from the capsule, for example, by dissolution. Examples of such machines are provided in EP 2393404 A1, EP 2470053 A1, EP 2533672 A1, EP 2509473 A1 EP 2685874 A1. The increased popularity of these machines may be partly attributed to enhanced user convenience compared to a conventional beverage preparation machine, for example, a stove-top espresso maker or a manually operated cafetiére (French press). It may also be partly attributed to an enhanced brewing process of the machine, wherein: the capsule is inserted into a extraction chamber; heated water is injected into an inlet made in the capsule; the ingredient within the capsule is extracted by the heated water through an outlet made in the capsule; a brewed beverage is collected from the outlet heated water. During this process operational parameters of the machine can be tailored to the specific capsule and/or ingredients therein to enhance the taste of the beverage. For example, the operational parameters may comprise: water temperature at inlet and outlet; pre-wetting duration; water flow rate; water quantity; other operations during the brewing process. In this way the brewing process is optimised.

Accordingly, there is a need to supply these operational parameters to the beverage preparation machine. Various codes and code reading systems have been developed for storing extraction information relating to these operational parameters on/in a capsule and reading the extraction information therefrom. An example is provided in US 2002/0048621 A1, wherein a surface of a capsule comprises a bar code which encodes the extraction information and a corresponding code reading system comprises a bar code reader. A further example is provided in FR 2912124, wherein a capsule comprises an RFID code. The RFID code transmits extraction information as a radio-frequency electromagnetic field in response to an applied magnetic field and the corresponding code reading system comprises a radio-frequency electromagnetic field reading system. A yet further example is provided in EP 2594171 A1, wherein a periphery of a flange of a capsule comprises a code arranged thereon. The code itself comprises a sequence of symbols are printed on the capsule during manufacture about a rotational axis of the capsule. The corresponding code reading system comprises a mechanism for rotating the capsule about the rotational axis and a stationary optical reader.

There is also a need to process a capsule supplied by the user to the machine to transfer it to the extraction unit. Various capsule transfer mechanisms have therefore been developed. An example is provided in WO2012126971, wherein a user places a capsule in a channel of a rotary member. The rotary member subsequently rotates into alignment with an extraction unit channel, at which point the capsule can be transferred to the extraction unit channel and into the extraction unit. A further example is provided in WO2014056642, wherein a user places the capsule on a capsule support member when in a receiving position. Subsequently the capsule support member is rotatably moved around the capsule to a transfer position, wherein the capsule is able to be transferred to the extraction unit. A yet further example is provided in WO2014056641, wherein according to one embodiment a user places the capsule on a capsule support member when in a receiving position. Subsequently the capsule support member rotatably splays apart to move to a transfer position, wherein the capsule is able to be transferred to the extraction unit.

A drawback of the above capsule transfer mechanisms and code reading systems is that in combination they are relatively complex, bulky and expensive to include on a beverage preparation machine.

BRIEF DESCRIPTION OF THE DRAWINGS

For a better understanding of the presently disclosed and/or claimed inventive concept(s), and to show how embodiments of the same may be carried into effect, reference will now be made, by way of example, to the accompanying diagrammatic drawings in which:

DETAILED DESCRIPTION

Figure 1:
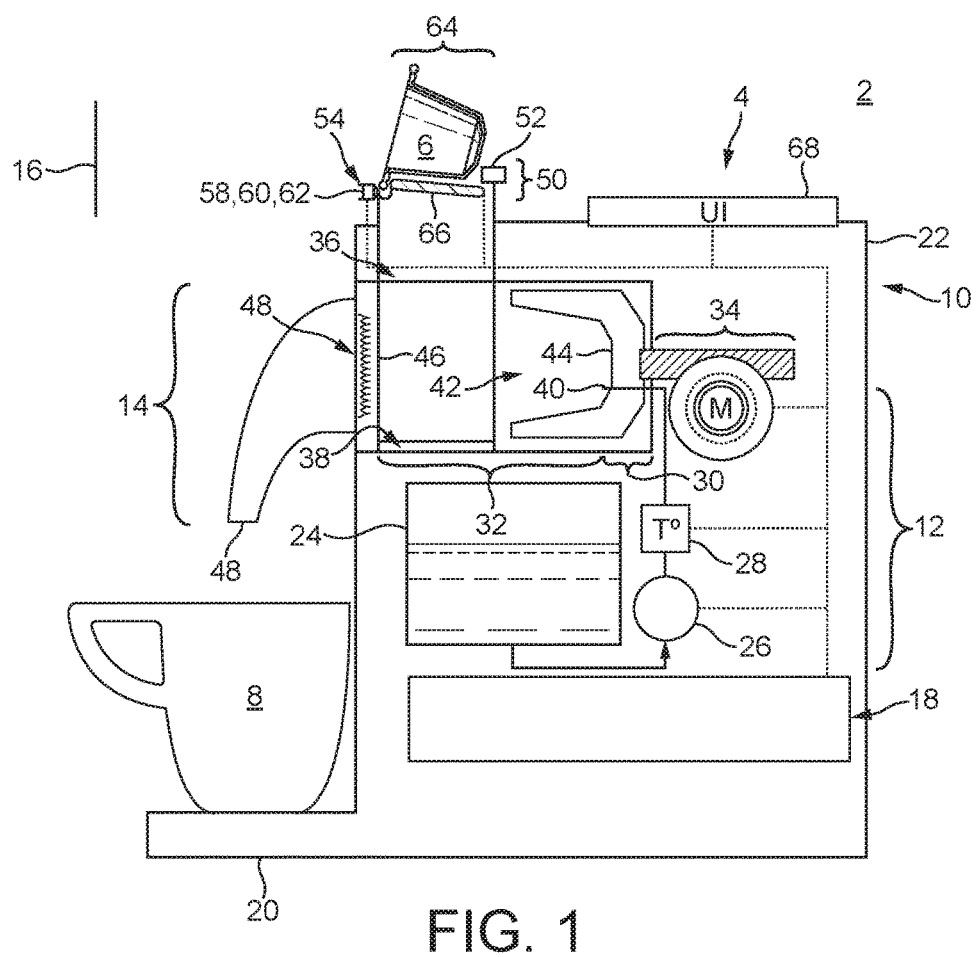
FIG. 1 is an illustrative view of a beverage preparation system that comprises a beverage preparation machine, a capsule and a receptacle according to the presently disclosed and/or claimed inventive concept(s)

A non-limiting object of the presently disclosed and/or claimed inventive concept(s) is to provide a capsule processing unit that is operable to read a code of a capsule and to transfer a capsule to an extraction unit that is relatively cost-effective.

A non-limiting object of the presently disclosed and/or claimed inventive concept(s) is to provide a capsule processing unit that is operable to read a code of a capsule and to transfer a capsule to an extraction unit that is relatively compact.

It would be advantageous to provide a capsule processing unit operable to read a code of a capsule and to transfer a capsule to an extraction unit that is un-complicated.

It would be advantageous to provide a capsule processing unit that is operable to process different sized capsules.

It would be advantageous to provide a capsule processing unit that is reliable, particularly for reading a code of a capsule.

It would be advantageous to provide a capsule processing unit that is safe and convenient to use.

Objects of the presently disclosed and/or claimed inventive concept(s) are achieved by the capsule processing unit, the beverage preparation machine, and the method according to the present disclosure and appended claims.

Disclosed herein and according to a first aspect of the presently disclosed and/or claimed inventive concept(s) is a capsule processing unit of a beverage preparation machine, which comprises an extraction unit to extract an ingredient of a beverage from a capsule during preparation of the beverage. The capsule processing unit comprising: a code reading system comprising a code reader and a code reading mechanism, the code reading mechanism configured to effect reading of a code of a capsule by the code reader by imparting relative movement between a code reader and capsule (e.g. during reading of the code); a capsule transfer mechanism configured to effect transfer (e.g. complete transfer without a further mechanism) of a capsule to the extraction unit; an actuator unit to actuate the code reading system to read the code and to actuate the capsule transfer mechanism to effect transfer of the capsule. The actuation unit comprises a single actuator, e.g. a single actuator actuates both the code reading and capsule transfer mechanisms in their entirety without the need for a further actuator. The capsule is generally processed to read the code of the capsule and subsequently transfer the capsule.

Accordingly, objects of the presently disclosed and/or claimed inventive concept(s) are solved since the capsule processing unit is cost-effective as it is operable to read a code of a capsule and to transfer said capsule to an extraction unit using a single actuator unit. Moreover, since a signal actuation unit is used the capsule processing unit is relatively compact and un-complicated.

The code reading mechanism and capsule transfer mechanism may be configured to receive movement from the actuator unit in a first direction to effect said reading of the code, and configured to receive movement from the actuator unit in a second direction to effect said transfer of the capsule. The code reading system and capsule transfer mechanism may comprise a drive train that is operatively linked to the actuator unit. The actuator unit may actuate the code reading mechanism and capsule transfer mechanism by rotary motion.

The code reading mechanism may be configured to effect reading of the code by imparting relative rotational movement between a code reader and capsule. The rotational movement may be about a capsule axis of rotation, which is typically a capsule rotational axis of symmetry. The code reading mechanism may be configured to effect reading of the code by imparting relative rotational movement to the capsule with respect to the code reader, wherein the code reader is connected to a body of the capsule processing unit (e.g. via an intermediate member) such that it is held in a fixed position. The code reading mechanism may comprise a capsule rotary drive member, the capsule rotary drive member being operable to receive rotary motion from the actuator unit and being operable to impart said rotary motion to a capsule. The capsule rotary drive member may be arranged to engage various portions of the capsule to impart said rotary motion, e.g.: a flange portion (such as the periphery of the flange), a body portion; a lid portion. The capsule may be held in contact with the capsule rotary drive member by means of gravity.

The code reader may comprise various readers which are selected in accordance with the particular formation of the code on the capsule. For example: for a code which is embossed on a metallic portion of the capsule the reader may be an inductive sensor; for a code which is printed on the capsule the reader may be an optical sensor.

The capsule transfer mechanism is typically configured to effect transfer of a capsule to the extraction unit by effecting transfer of the capsule to a capsule insertion channel of the extraction unit, e.g. by: removal of a constraint such as a movable capsule support that prevent transmission to the insertion channel; by effecting movement of the capsule to the insertion channel.

The capsule transfer mechanism may comprise a movable capsule support (e.g. a support which the capsule sits on), which is actuated (e.g. via rotation) between a capsule support position and a capsule transfer position by means of a capsule support drive mechanism. The capsule support drive mechanism may comprise a capsule support actuation member and an actuation member drive mechanism, wherein the capsule support actuation member is operatively connected to the movable capsule support and the actuation member drive mechanism is operatively connected to the capsule support actuation member, the actuation member drive mechanism being operable to actuate the capsule support actuation member to move the movable capsule support between the said capsule support position and the said capsule transfer position.

The capsule support actuation member may comprise at a first arm that at a proximal end is operatively connected to the movable capsule support and at a distal end is pivotally connected to a body of the beverage machine or capsule support unit.

The capsule support actuation member may comprise a second arm that at a proximal end is operatively connected to a second part of the movable capsule support and at a distal end is pivotally connected to a body, and the proximal end of the first arm is connected to a first part of the movable capsule support, the first and second arm being operatively linked by a torque transmission means, which is configured to transmit corresponding rotary motion between the arms, the first part being movable relative the second part by the capsule support actuation member to implement the said capsule support and transfer positions. The actuation member drive mechanism may comprise a drive train having a one-way clutch, a crank and a connecting member, the drive train being operatively linked to the actuation unit, the one-way clutch being configured to transfer rotary motion to the crank when the actuation unit supplies rotary motion in a second direction only, the connecting member being operatively connected to the actuation member and crank so that rotation of the crank effects movement of the movable capsule support between the said capsule support position and capsule transfer position.

The capsule processing unit may further comprise a movable support system, the movable support system comprising a movable support that is pivotally supported at a proximal end to a body of the capsule processing unit, and a movable support drive mechanism that is operable to drive the movable support between a capsule support position and capsule transfer position corresponding to the positions of the movable capsule support, wherein the movable support has mounted thereto the code reading system such that the capsule rotary drive member is operable to move between corresponding capsule support and transfer positions. Other components of the capsule processing unit may be supported on the movable support, such as the actuation unit and capsule transfer mechanism. The movable support drive mechanism may comprise: a cam operatively connected to the actuation unit such that it receives rotary motion therefrom; a cam engagement member which is connected to a body of the capsule processing unit, wherein the cam and cam engagement member are configured such that their engagement effects movement of the movable support between the capsule support and transfer position.

The capsule processing may comprise a capsule detection system comprising one or more sensors arranged to detect the presence of a capsule on a movable capsule support of the capsule processing unit. In certain non-limiting embodiments, the sensors are inductive sensors; however, other suitable sensors may be used, such as optical sensors, or a combination thereof.

The capsule detection system may comprise a first arrangement of one or more sensors arranged to detect the presence of a capsule on the movable capsule support and a second arrangement of one or more sensors arranged to detect a geometric property of a portion of the capsule to determine a type of the capsule. The detected geometric property may be a length of a portion of the capsule, e.g.: the body portion, such an axial length of a base of a cavity of the body portion from a lid portion; the flange portion. The first and second arrangement of the one or more sensors may be arranged at least 1 cm apart from each other. Moreover, one of the sensors may comprise the code reader of the code reading system. The first arrangement of sensors may be arranged with a sensor on the first part and a sensor on the second part of the movable capsule support. It is advantageous to have a plurality of sensors to detect the presence of a portion of the capsule since the portion can become deformed such that its presence is not accurately detected by a single sensor.

Disclosed herein and according to a second aspect of the presently disclosed and/or claimed inventive concept(s) is a beverage preparation machine comprising: an extraction unit operable to extract an ingredient of the beverage from a capsule during preparation of the beverage; a fluid supply operable to supply fluid to the extraction unit; a capsule processing unit according to any feature of the first aspect.

The beverage preparation machine may comprise a control system being operable to control the actuator unit to actuate the code reading system to read the code and to actuate the capsule transfer mechanism to effect transfer of the capsule. The control system may be operable to control the actuator unit to move in a first direction to actuate the code reading system to read the code and to moving in a second direction to actuate the capsule transfer mechanism to effect transfer of the capsule.

The control system may comprise a processing unit, the processing unit being operable to control the actuator unit to control the code reading system and capsule transfer system. The sensors of the capsule detection system may be in communication by means of a sensor signal.

The processing unit may be operable to (e.g. it comprises suitable program code): determine from said sensor signal if capsule present and if capsule present then effect reading of a code of a detected capsule using the code reading system then effect transfer of said capsule to an extraction unit using the capsule transfer mechanism.

The processing unit may be operable to (e.g. it comprises suitable program code): determine if signal from first sensor arrangement indicates capsule and if signal from second sensor arrangement indicates first type of capsule then first type capsule detected else and if signal from second sensor arrangement indicates second type of capsule then second type capsule detected then transfer detected first or second type capsule to extraction unit, i.e. by controlling the actuator unit to actuate the capsule transfer mechanism.

The signal from the second sensor arranged may only be considered if the first sensor arrangement indicates that a capsule is present. Alternatively, a capsule may only be considered present if the signal a from both the first and second sensor arrangements indicates a capsule is present.

The processing unit may be operable to (e.g. it comprises suitable program code): determine no capsule present or unsuitable capsule present if signal from the first sensor arrangement indicates no capsule detected, e.g. when the first sensor arrangement indicates that there is no capsule present but the second sensor arrangement indicates that a capsule is present. The sensor signal may indicate that there is no capsule present by either no signal or by no change in a baseline signal. Moreover, an unsuitable capsule may be determined if the first sensor arrangement comprises a plurality of sensors and not all of the sensors indicate that a capsule is present: such as when a capsule is deformed in proximity to the sensors.

The processing unit may be operable to (e.g. it comprises suitable program code): effect reading of code of second and/or first type capsule (i.e. by controlling code reading system) if the corresponding capsule type is detected. If the code is read successfully then the capsule may be transferred for the first and/or second capsule types, else the capsule may be transferred without reading of the code.

The processing unit may be operable to (e.g. it comprises suitable program code): control the fluid supply and/or the extraction unit using information related to the detected type of the capsule. For example, if a first type capsule is detected then information relating to the first type capsule that is stored on a memory unit of the processing unit is used to control said components, whereas if a second type capsule is detected then information relating to the second type capsule that is stored on a memory unit of the processing unit is used to control said components. The information may for example comprise one or more of the: water volume; temperature; brew time; other associated operational parameter.

The code reader of the code reading system may be in communication with the processing unit by means of a code signal and the processing unit may be operable to (e.g. it comprises suitable program code) to determine extraction information from the code signal. The processing unit may further be operable to (e.g. it comprises suitable program code) control the fluid supply and/or the extraction unit using at least part of the determined extraction information and/or at least part of the determined extraction information is stored on the memory unit for monitoring of capsule consumption and/or usage of the beverage preparation machine.

Disclosed herein and according to a third aspect of the presently disclosed and/or claimed inventive concept(s) is a method of processing a capsule with the capsule processing unit comprising any feature of the first aspect, the method comprising: actuating with the actuator unit the code reading system to read a code of a capsule; actuating with the actuator unit the capsule transfer mechanism to transfer the capsule to the extraction unit.

Disclosed herein and according to a fourth aspect of the presently disclosed and/or claimed inventive concept(s) is a method of preparing a beverage with a beverage preparation machine comprising any feature of the first aspect, the method comprising: processing a capsule according to the method of the third aspect; controlling the extraction unit and fluid supply to extract an ingredient of the beverage from the capsule.

Disclosed herein according to a fifth aspect of the presently disclosed and/or claimed inventive concept(s) is a use of a capsule for a capsule processing unit or a beverage preparation machine according to any of the preceding aspects.

The above aspects of the presently disclosed and/or claimed inventive concept(s) may be combined in any suitable combination. Moreover, various features herein may be combined with one or more of the above aspects to provide combinations other than those specifically illustrated and described. Further objects and advantageous features of the presently disclosed and/or claimed inventive concept(s) will be apparent from the claims, from the detailed description, and annexed drawings.

Beverage Preparation System

FIG. 1 shows an illustrative view of a beverage preparation system 2, which comprises at a first level: a beverage preparation machine 4; a capsule 6; a receptacle 8.

Beverage Preparation Machine

With further reference to FIG. 1, initially the beverage preparation machine 4 will be described. Functionally, the beverage preparation machine 4 is operable to extract one or more ingredients from the capsule 6 by means of the injection of fluid in to the capsule, whereby the extracted ingredient forms at least part of a beverage collected in the receptacle 8 (e.g. a cup). Generally the beverage preparation machine 4 is dimensioned for use on a work top, i.e. it is less than 50 cm in length, width and height. Examples of suitable beverage preparation machines 4 are disclosed in EP 2393404 A1, EP 2470053 A1, EP 2533672 A1, EP 2509473 A1 EP 2685874 A1, all of which are incorporated herein by reference. For completeness such a beverage preparation machine 4 will now be described in more detail, and can be considered to comprise at a first level of the beverage preparation machine 4: a housing 10; a fluid supply 12; an extraction unit 14; a capsule processing unit 16; a control system 18. These components will now be sequentially described:

Housing

The housing 10 houses and supports the aforementioned first level components and comprises at a second level of the beverage preparation machine 4: a base 20 and a body 22. The base 20 being for abutment with a support surface. The body 22 being for mounting thereto the other first level components.

Fluid Supply

The fluid supply 12 is operable to supply fluid, which is in general water that is heated, to the extraction unit 14. The fluid supply 12 typically comprises at a second level of the beverage preparation machine 4: a reservoir 24 for reservoir containing fluid, which in most applications is 1-2 liters of fluid; a fluid pump 26, such as a reciprocating or rotary pump; a fluid heater 28, which generally comprises a thermo block type heater; an outlet, for supplying the fluid to the extraction unit 14, which will be discussed. The reservoir 24, fluid pump 26, fluid heater 28, and outlet are in fluid communication with each other in any suitable order and form a fluid supply circuit. In an alternative example the fluid supply 12 may comprise a connection to an external fluid source e.g. a water main.

Extraction Unit

The extraction unit 14 is operable to receive and process the capsule 6 to extract an ingredient therefrom. The extraction unit 14 typically comprises at a second level of the beverage preparation machine 4: an injection head 30; a capsule holder 32; a capsule holder loading mechanism 34; a capsule insertion channel 36; a capsule ejection channel 38, which are sequentially described:

The injection head 30 is configured to inject fluid into a cavity of the capsule 6 when held by the capsule holder 32, and to this end has mounted thereto an injector 40 that is in fluid communication with the outlet of the fluid supply 12. The injection head 30 generally comprises a lance, or other suitable member, with the injector 40 extending therethrough, for perforation of the capsule 6 to form an inlet to the said cavity.

The capsule holder 32 is configured to hold the capsule during extraction and to this end it is operatively linked to the injection head 30. The capsule holder 32 is operable to move between a capsule receiving position and a capsule extraction position: with the capsule holder 32 in the capsule receiving position a capsule 6 can be supplied to the capsule holder 32 from the capsule insertion channel 36; with the capsule holder 32 in the capsule extraction position a supplied capsule is held by the holder, the injection head 30 can inject fluid into the held capsule, and one or more ingredients can be extracted therefrom. When moving the capsule holder 32 between the capsule extraction position and the receiving position a spent capsule can be ejected from the capsule holder 32 via the capsule ejection channel 38. In the referenced example the capsule holder 32 comprises: a cavity 42 with a cavity base 44 consisting of the injection head 30 mounted thereto; an extraction wall 46 having an outlet 48 for the extracted ingredients. To implement the capsule receiving and the capsule extraction positions the extraction wall 46 and cavity can be moveable relative to each other. In another example the cavity can be fixed to the extraction wall and to implement the capsule receiving and capsule extraction positions the injection head is movable relative the cavity: an example of such a system is provided in WO 2009/113035, which is incorporated herein by reference.

The capsule holder loading mechanism 34 is operable to drive the capsule holder 32 between the capsule receiving position and the capsule extraction position. To this end the capsule holder loading mechanism 34 typically comprises a linear actuator, such as a motor or solenoid, and an actuatable mechanism, such as a rack and pinion arrangement. The capsule holder loading mechanism 34 may alternatively be mechanically actuated, for example, by an arrangement of linkages as disclosed in WO 2009/113035.

The extraction unit 14 can operate by means of injection of fluid at pressure into the cavity of the capsule 6 as in the illustrated example. It may also operate by centrifugation as disclosed in EP 2594171 A1, which is incorporated herein by reference.

Capsule Processing Unit

The capsule processing unit 16 is operable to process the capsule 6 to read a code thereon to provide a code signal and is further operable to transfer the capsule 6 to the extraction unit 14. Generally, the capsule processing unit 16 is arranged above the extraction unit 14 and is integrated as part of the body 22 of the beverage preparation machine 4 with its various sub components attached thereto. However the capsule processing unit 16 may alternatively be a separable unit e.g. it comprises a separate body to which its various sub-components are attached, the body being arrange so that a capsule is transferred to the extraction unit 14. The capsule processing unit 16 comprises at a second level of the beverage preparation machine 4: a code reading system 50; a capsule transfer mechanism 64; an actuator unit 112; optionally a capsule detection system 170, which are sequentially described:

Code Reading System of Capsule Processing Unit

The code reading system 50 comprises a code reader 52 and a code reading mechanism 54. The code reader 52 is configured to read the code during relative movement between a reading head of the code reader 52 and the code of the capsule. The code reading mechanism 54 is operable to effect the said relative movement and will be discussed following the code reader 52. The code reader 52 is operable to read the code of the capsule 6 to generate a code signal. The generated code signal can be either analogue or digital (e.g. the code reader 52 comprises an ASIC for digital conversion). The code reader 52 may comprise various readers which are selected in accordance with the particular formation of the code on the capsule. For example: for a code which is embossed on a metallic portion of the capsule the reader may be an inductive sensor; for a code which is printed on the capsule the reader may be an optical sensor. An example of a suitable inductive sensor is a POSIC Sensor (www.posic.ch) reference ID1301 000002. With such a sensor the preferred (but non-limiting) reading configuration is: relative velocity of the code to the sensor 0.137 m/s; embossing depth 0.3 mm; reading distance 0.5 mm. A further example of a suitable inductive sensor is a Texas LDC 1000 series sensor. An example of a suitable optical sensor is a light source, lens and light sensor operable to translate optical impulses into electrical impulses.

FIG. 1 shows an example wherein the code reader 52 comprises an inductive sensor. The inductive sensor is arranged with a reading head proximate a base of a cavity of a body portion of the capsule 6 and with the reading head aligned to the capsule axis of rotation. It will be appreciated that the particular arrangement of the code reader 52 will vary in accordance with the arrangement of the code on the capsule 6 and how it is read.

Figure 2:
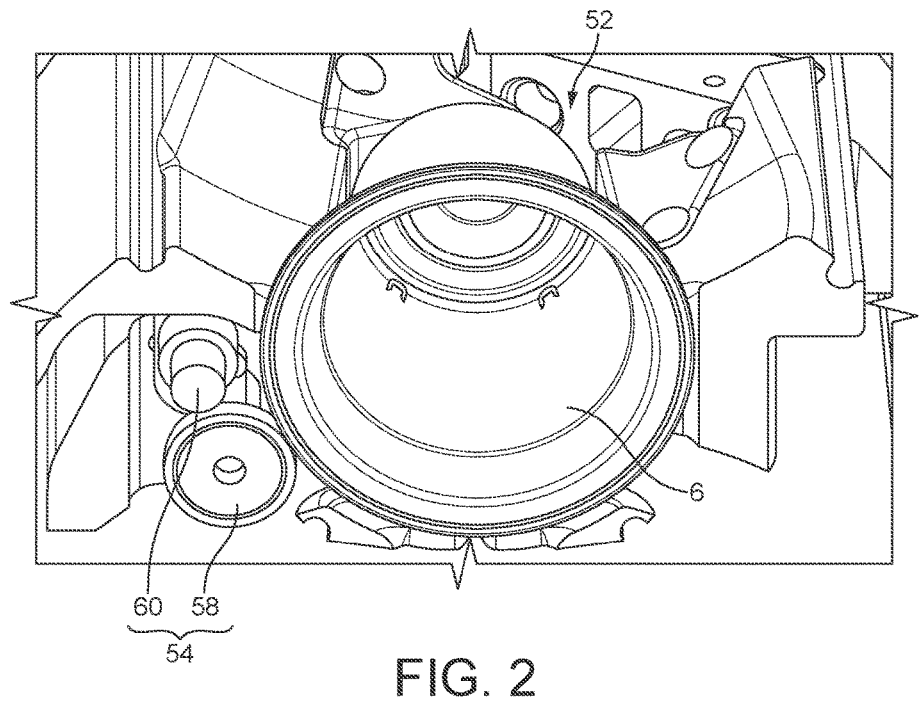
FIG. 2 shows a perspective view of a first embodiment of a code reading mechanism of the beverage preparation machine according to FIG. 1.

The code reading mechanism 54 is operable to provide the said relative movement between the reading head of the code reader 52 and the code of the capsule either by displacing the capsule to move relative the code reader 52 or by displacing the code reader 52 to move relative the capsule. In both cases the relative movement may be: rotational, wherein the code is arranged around a rotational axis of the capsule; translational, wherein the code is arranged along an axis of the capsule. Examples of such code reading mechanism are now provided:

In a particular (but non-limiting) first embodiment of the code reading mechanism 54 that is shown in FIGS. 1 and 2, the code reading mechanism 54 is operable to displace the capsule 6 to move relative the code reader 52. In particular the code reading mechanism 54 is operable to drive the capsule 6 to rotate about a capsule axis of rotation. To this end the code reading mechanism 54 comprises a capsule rotary drive member 58 and an optional drive train 60 which may comprise one or more gears, wherein the capsule rotary drive member 58 is driven by the actuator unit 112 (not shown in FIGS. 1 and 2) via the drive train 60. The capsule rotary drive member 58 is arranged to engage a portion of the capsule 6 to rotationally drive the capsule 6. In the example the engaged portion of the capsule 6 is a flange portion; however, it will be appreciated that in other examples other portions of the capsule 6 may be engaged by the capsule rotary drive member 58. In the example the capsule rotary drive member 58 is rotated in the anticlockwise direction when the actuator unit 112 provides rotation to the drive train 60 in a first direction.

Figure 3:
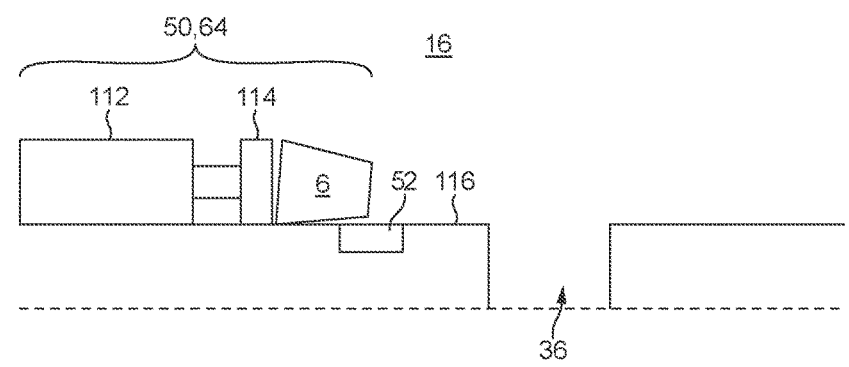
FIG. 3 is an illustrative cross-sectional view of a second embodiment of a code reading mechanism of a beverage preparation machine.

In a second embodiment of the code reading mechanism 54 that is shown in FIG. 3, the code reading mechanism 54 is operable to displace the capsule 6 to move relative the code reader 52. In particular the code reading mechanism 54 is operable to drive the capsule 6 to translate along an axis of the capsule. To this end the code reading mechanism 54 comprises: a capsule support channel 116, which is for receiving a capsule from a user and supporting said capsule; a capsule actuation member 114, which is driven by the actuator unit 112 either directly, e.g. in the case that the actuator unit 112 is a linear actuator, or via a gear train that may include a crank shaft, e.g. in the case that the actuator unit 112 is a rotary actuator. The code reader 52 is connected to a portion of the capsule support channel 116 and the capsule actuation member 114 is operable to drive the capsule 6 along the capsule support channel 116 to effect reading of a code of the capsule.

Figure 4:
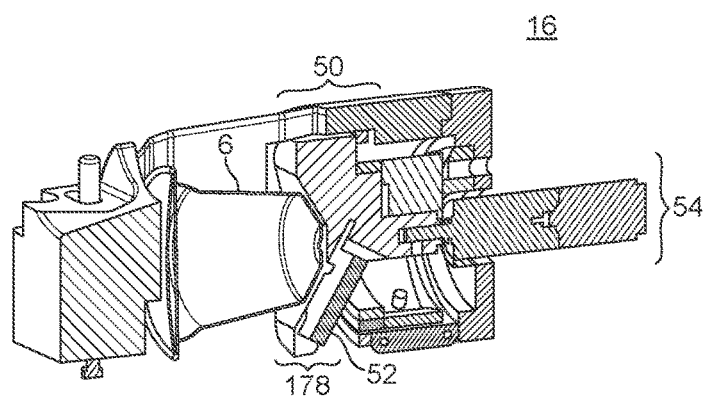
FIG. 4 is a perspective view of a third embodiment of a code reading mechanism of a beverage preparation machine.

In a third embodiment of the code reading mechanism 54, the code reading mechanism 54 comprises a similar arrangement to that of the first embodiment code reading mechanism 54; however, it is operable to displace the code reader 52 to move relative the capsule. In particular, the code reading mechanism 54 is operable to drive the code reader 52 to rotate about a capsule axis of rotation. To this end, as shown in FIG. 4, the code reading mechanism 54 comprises a code reader rotary drive member 178 with the code reader 52 attached thereto, wherein the code reader rotary drive member 178 is driven by the actuator unit 112 via a drive train (both of which are not shown in FIG. 4). The code reader rotary drive member 178 is arranged to rotate about a portion of the capsule that comprises the code, such as the axis of rotation.

In a fourth embodiment of the code reading mechanism 54, the code reading mechanism 54 comprises a similar arrangement to that of the second embodiment code reading mechanism 54; however, it is operable to displace the code reader 52 to move relative the capsule. In particular, the code reading mechanism 54 is operable to drive the code reader 52 to translate along an axis of the capsule. To this end code reading mechanism 54 comprises a code reader actuation member that is driven by the actuator unit 112 either directly, e.g. in the case that the actuator unit 112 is a linear actuator, or via a gear train that may include a crank shaft, e.g. in the case that the actuator unit 112 is a rotary actuator.

Referring back to FIGS. 1 and 2, for the first and third embodiments of the code reading mechanism 54, the code reading mechanism 54 may further comprise a read cycle sensor 62, which is operable to provide a read cycle signal. The read cycle signal comprises information to determine the number of read cycles, that is the number of complete reads of the code contained in an acquired portion of the code signal. The read cycle sensor 62 may for example be a switch and switch actuator operable to provide one or more pulses in the read cycle signal for each rotation of the actuator unit 112 or other part of the drive train 60.

Capsule Transfer Mechanism of Capsule Processing Unit

The capsule transfer mechanism 64 will now be discussed and is operable to transfer a processed capsule to the extraction unit 14 (e.g. via the capsule insertion channel 36). To this end it is generally arranged discrete from and above the extraction unit 14. The capsule transfer mechanism 64 may for example effect transfer of a capsule by removal of a constraint constraining the capsule or by displacement of the capsule to the capsule insertion channel 36, examples of which will now be discussed:

In a particular (but non-limiting) first embodiment of the capsule transfer mechanism 64, which is shown in FIGS. 1, 5, 6, 7, 8 and 9 is for use with the first or third embodiment code reading mechanism 54, the capsule transfer mechanism 64 comprises a: movable capsule support 66; capsule support drive mechanism 124, which will be described:

The movable capsule support 66 is arranged to receive a capsule from a user and is movable relative the body 22, to effect transfer of a capsule supported thereon to the extraction unit 14. More particularly, it is movable between a capsule support position (FIG. 5, 7) and a capsule transfer position (FIG. 6), wherein: when in the capsule support position the code of the capsule 6 can be read by the code reading system 50; when in the capsule transfer position transfer of a supported capsule 6 is effected to the extraction unit 14. The movable capsule support 66 is driven between the positions by means of the capsule support drive mechanism 124, which is in turn driven by the actuator unit 112 as will be discussed.

Figure 5:
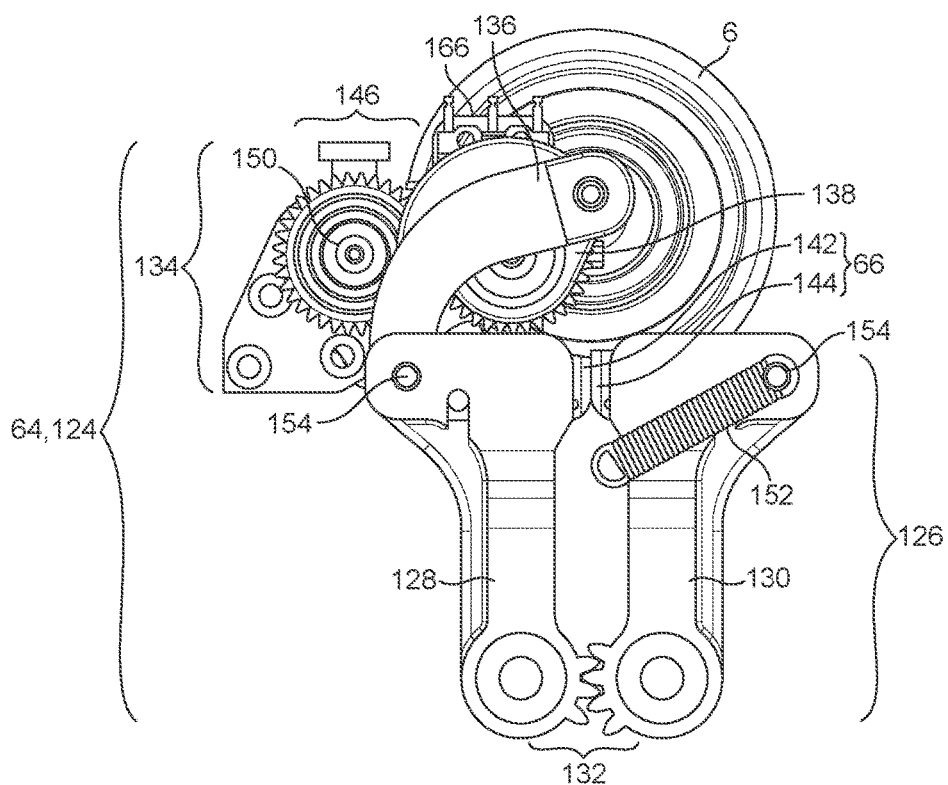
FIG. 5 is a front view of a capsule transfer mechanism of the beverage preparation machine according to FIG. 1 when in a capsule support position.
Figure 6:
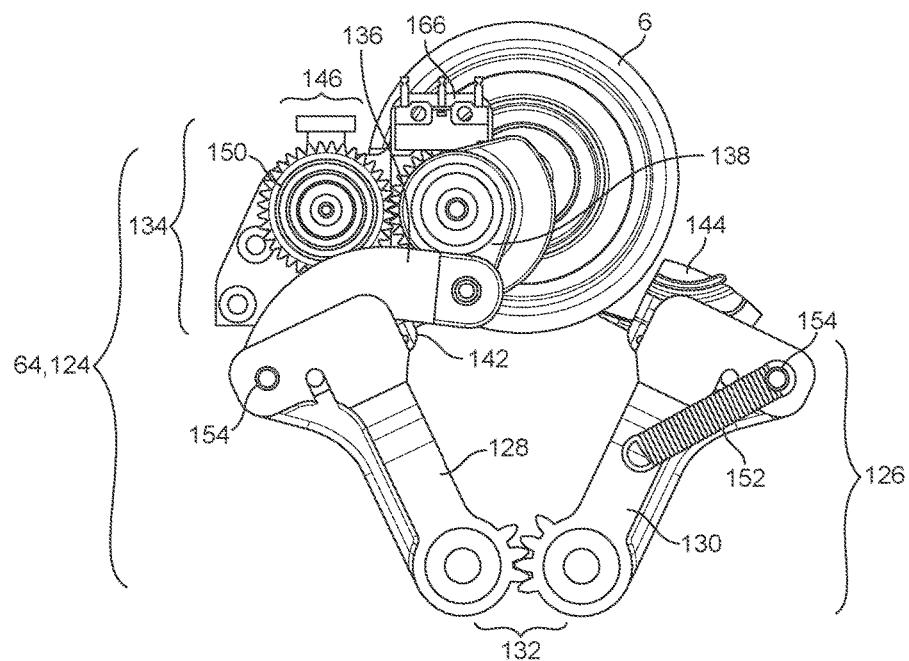
FIG. 6 is a front view of a capsule transfer mechanism of the beverage preparation machine according to FIG. 1 when in a capsule transfer position.
Figure 7:
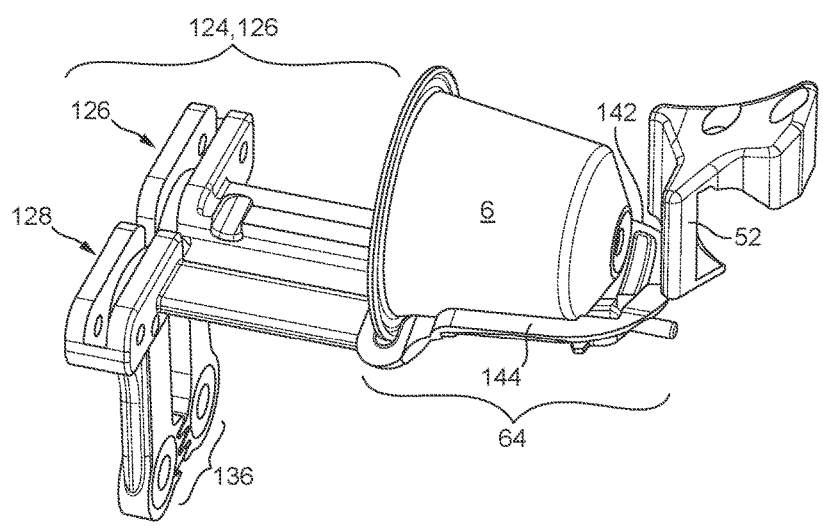
FIG. 7 is a perspective view of part of the capsule transfer mechanism according to FIG. 5.

In the example shown in FIGS. 5, 6, and 7 the movable capsule support 66 is formed of a first part 142 and second part 144, which are separable from the capsule support position to provide the capsule transfer position. The movable capsule support 66 may further comprise an annular groove for locating a flange of a capsule therein and a capsule body support portion arranged adjacent thereto. In certain non-limiting embodiments, the capsule support 66 is configured to support capsules of different shapes.

The capsule support drive mechanism 124 comprises a capsule support actuation member 126 and an actuation member drive mechanism 134, which will now be described:

Referring to FIGS. 5, 6, and 7 in particular, the capsule support actuation member 126 comprise a first arm 128 and a second arm 130, which are movable to actuate the movable capsule support 66 between the capsule support position and the capsule transfer position. To this end the first arm 128 and a second arm 130 have; a proximal end that is connected to the movable capsule support 66, which extends substantially orthogonally therefrom; a distal end that is pivotally connected to the body 22 (e.g. via an intermediate member) about a pivot axis that is generally aligned to the said orthogonal extension of the movable capsule support 66. More particularly: the first arm 128 at a proximal end is connected to the first part 142 of the movable capsule support 66; the second arm 130 at a proximal end is connected to the second part 144 of the movable capsule support 66; the first arm 128 at a distal end is pivotally connected to an arm support of the body 22; the second arm 130 at a distal end is pivotally connected to the arm support of the body 22; the arms 128, 130 pivot about the pivoted support in a plane that is generally orthogonal to the pivot axis.

The proximal ends of the arms 128, 130 are operatively linked by a torque transmission means 132, which is configured to transmit corresponding rotary motion between the arms. In the illustrative figures the torque transmission means 132 comprise meshed teeth arranged around a curved periphery of the distal end; however, other means may be used such as a friction coupling. Moreover, the torque transmission means 132 may alternatively be arranged distal the proximal ends, e.g. as meshed gears on the end of shafts that comprise the pivoted support.

Figure 8:
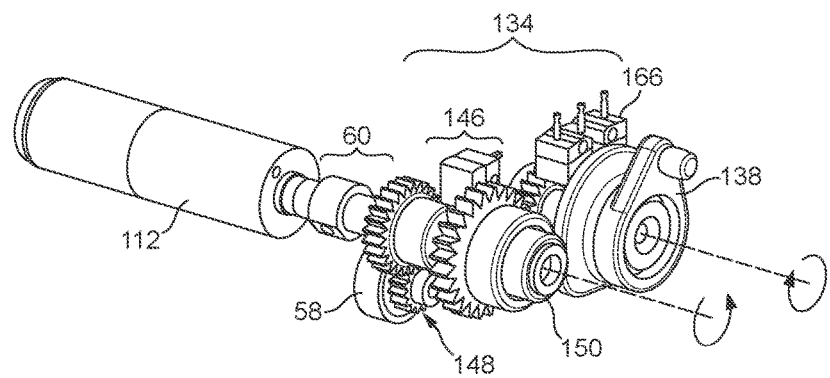
FIG. 8 is a perspective view of an actuation member drive mechanism of the capsule transfer mechanism according to FIGS. 5 and 6.
Figure 9:
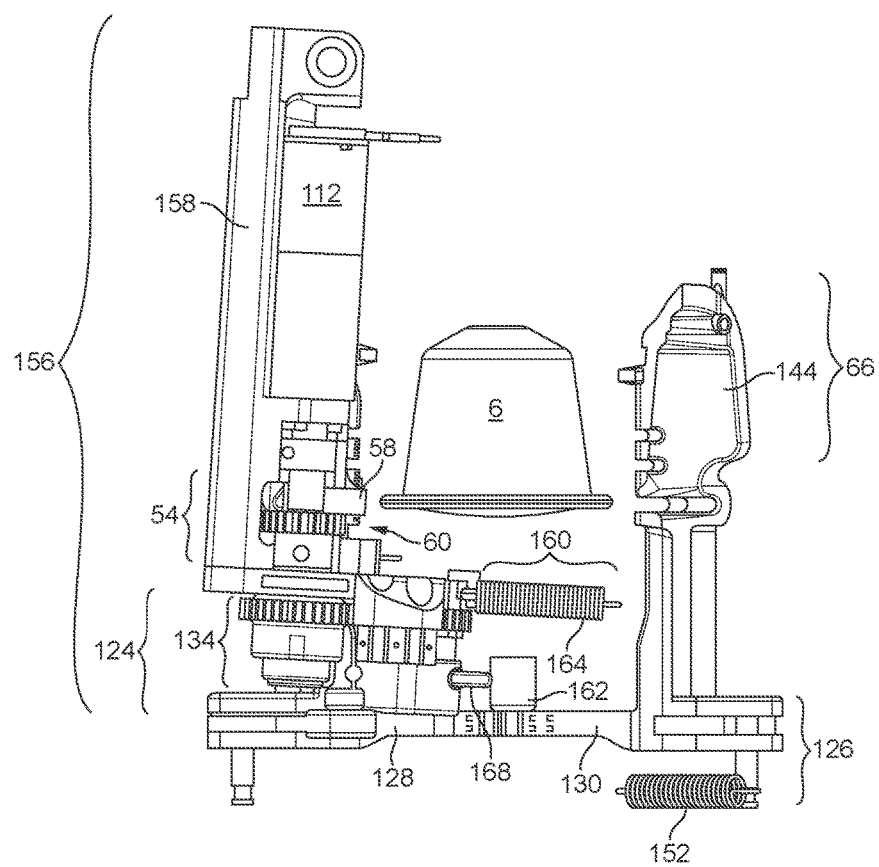
FIG. 9 is a plan view of a movable support system of the capsule transfer mechanism according to FIGS. 5 and 6.

The capsule support actuation member 126 is driven between the said capsule support position and the capsule transfer position by the actuation member drive mechanism 134. The actuation member drive mechanism 134 comprises a: connecting member 136; crank 138; a drive train 146. With reference to FIGS. 5, 6, and 8, the drive train 146 comprises; gears 148; a one-way clutch 150 e.g. a freewheel or overrunning or sprag variant. The one-way clutch 150 is operatively coupled to the actuator unit 112 by means of the gears 148. The one-way clutch 150 is configured such that torque is transmitted to the crank 138 to effect its rotation only in a one direction, which in the exemplary figure is the clock-wise direction.

Upon rotation of the crank 138 in the said direction, an arm of the crank 138 imparts a reciprocating motion to the connecting member 136 that is pivotally connected thereto at a proximal end of the connecting member 136. A distal end of the connecting member 136 is pivotally connected to an extension arranged at the proximal end of the first arm 128 of the capsule support actuation member 126 (although it will be appreciated that the connecting member 136 may be connected to other portions of the arm). Accordingly, the reciprocating motion imparted to the connecting member 136 is further imparted to the capsule support actuation member 126 to drive it between the said capsule support position and the capsule transfer position. Accordingly: for a half rotation of the crank 138, the movable capsule support 66 can be moved from the capsule support position to the capsule transfer position; for a further half rotation of the crank 138 in the same (or the reverse) direction, the movable capsule support 66 is moved from the capsule support position to the capsule transfer position. For the correct reciprocating motion to be imparted to the capsule support actuation member 126, the connecting member may be curved between its proximal and distal ends, with a portion therebetween arranged to engage a stop of the extension of the first arm 128.

The arms 128, 130 may be biased by means of a biasing member into one of the said capsule support and the capsule transfer positions. With reference to FIGS. 5 and 6, the biasing member comprises an extension spring 152 arranged with a proximal end attached to the proximal end of the second arm 130 and arranged with a distal end connected to the body 22 (e.g. via an intermediate member). Accordingly, herein the arms 128, 130 are biased into the capsule support position.

The arms 128, 130 may optionally be guided between the said capsule support and the capsule transfer positions by a guide member 154. With reference to FIG. 5, the guide member 154 may comprise extensions that extend from the proximal ends of the arms 128, 130 and which slide within corresponding channels of or connected to the body 22 (e.g. via an intermediate member).

When the first embodiment code reading mechanism 54 is combined with the first embodiment capsule transfer mechanism 64, to enable the a capsule 6 to be transferred to the extraction unit 14, various components of the capsule processing unit 16, in addition to the said movable capsule support 66, may move between corresponding capsule support and capsule transfer positions.

In the exemplary embodiment the: actuation member drive mechanism 134; actuator unit 112; code reading mechanism 54 are movable to enable the retraction of the capsule rotary drive member 58 of the code reading mechanism 54 to the said capsule transfer position. To this end the capsule processing unit 16 may further comprise a movable support system 156, which with reference to FIGS. 6 and 9 comprises a movable support 158 and movable support drive mechanism 160. The movable support 158 comprises at a proximal end a pivoted connection to the body 22 (e.g. via an intermediate member). The movable support drive mechanism 160 is operable to drive the movable support 158 between the corresponding capsule support and capsule transfer positions. In an example, the movable support drive mechanism 160 comprises, proximal the pivot, a cam 168 and a cam engagement member 162. The cam 168 is rotatably connected to the actuation member drive mechanism 134, and in the illustrated example the crank 138. The cam engagement member 162 is part of the body 22 (or an intermediate member connected thereto). The profile of the cam 168 is configured such that its rotation against the cam engagement member 162 effects movement of the movable support 158 between the said corresponding capsule support and capsule transfer positions. The cam 168 is preferable biased into engagement with the cam engagement member 162 by means of a cam biasing member 164. The movable support 158 comprises attached thereto the actuation member drive mechanism 134, actuator unit 112, code reading mechanism 54 i.e. the components that are operatively connected to the capsule rotary drive member 58.

In a further embodiment (not shown) only the capsule rotary drive member 58 is moved. In such an embodiment the capsule rotary drive member 58 is attached to the said movable support system 156, which is driven by the said movable support drive mechanism 160. The capsule rotary drive member 58 can be disengaged and re-engaged with the drive train 60 by configuring the drive train 60 and capsule rotary drive member 58 to be rotatably coupled by means of a friction coupling, which is displaced apart during said movement.

The actuation member drive mechanism 134 may further comprise a position sensor, which is operable to provide a position signal. The position signal comprises information to determine the position of the components of the actuation member drive mechanism 134 or a component connected there to e.g. the movable capsule support 66. In an example, as shown in FIG. 8, the position sensor 166 comprises a switch which is actuated by a cam rotatably connected to the crank 138 to provide one or more pulses in the position signal for each rotation thereof.

The actuation member drive mechanism 134 and the first or third embodiment code reading mechanism 54 are operatively linked such that the said rotation of the actuator unit 112 in the first direction rotates the capsule rotary drive member 58 of the code reading mechanism 54 to effect reading of the code. However, the one-way clutch 150 acts to isolate the said rotation from the crank 138 and therefore the movable capsule support 66. However, rotation from the actuator unit 112 in the second direction is transmitted via the one-way clutch 150 to the crank 138 to effect movement of the movable capsule support 66 between the said capsule support and capsule transfer positions. For the first embodiment code reading mechanism 54, it is to be noted that rotation of the actuator unit 112 in the second direction also drives the capsule rotary drive member 58 in the reverse direction: however this has a nominal effect on the capsule 6 since it can be retracted by means of the aforementioned movable support system 156.

A capsule processing unit 16 that comprises the combination of the first or third embodiment code reading mechanism 54 and first embodiment capsule transfer mechanism 64 is therefore operable to: read the code of the capsule 6 when the actuator unit 112 is rotated in a first direction; to effect transfer of the capsule 6 to the extraction unit 14 when the actuator unit 112 is rotated in the second direction.

The above first embodiment of the capsule transfer mechanism 64, may be adapted in various ways. For example, the movable capsule support 66 may comprise only a first part 142 that is connected to a single arm 128 or 130 of the capsule support actuation member 126. Moreover, the or each arm 128, 130 of the capsule support actuation member 126 or other suitable actuation component may be translatably movable relative the body 22 rather than being pivotally movable as in the aforementioned example. Translational movement can, for example, be achieved by adapting the channels of the said guide member 154 to be linear, with the actuation member drive mechanism 134 being correspondingly adapted by making the connecting member compliant.

In a second embodiment (not shown) of the capsule transfer mechanism 64, the capsule transfer mechanism 64 comprise a similar arrangement to that of the first embodiment capsule transfer mechanism 64, that is it comprises the: movable capsule support 66, having a first part 142 and a second part 144; capsule support drive mechanism 124, having a capsule support actuation member 126 comprising a first arm 128 and a second arm 130 (which are pivotally connected to the body 22), a torque transmission means 132, a biasing member 152, a guide member 154; position sensor 166; movable support system 156.

However the actuation member drive mechanism 134 comprises: a drive train 146, comprising gears; a wedge; an axle, which at a distal end is screw threadably connected to the body 22 (e.g. via an intermediate member). The gears rotatably drive the axle, which as a result of the threadably connection causes linear motion of the axle along the rotational axis of the axle. The wedge is rotatably mounted at a proximal end of the axle. Accordingly, rotation of the axle in either direction effects linear opposed motion of the wedge. The wedge is configured and arranged such that it engages one of the arms 128, 130 of the capsule support actuation member 126 to effect pivoting of the said arm. The said arm can be biased into contact with the wedge by means of the biasing member 152. Movement of the wedge in a first direction can effect movement of the movable capsule support 66 from the capsule support position to the capsule transfer position, whereas movement of the wedge in a second opposed direction can effect movement of the movable capsule support 66 from the transfer support position to the capsule support position. The actuation member drive mechanism 134 is configured such that during reading of the code of the capsule by the code reading system 50, the wedge is moved in the first direction, and subsequent to code reading it engages the said arm to effect capsule transfer. Thereafter, the position of the wedge can be re-set by moving it in the second direction.

A capsule processing unit 16 that comprises the second embodiment capsule transfer mechanism 64 may be combined with the first or third embodiment code reading mechanism 54. Such as capsule processing unit is operable to: read the code of the capsule 6 when the actuator unit 112 is rotated in a first direction; to effect transfer of the capsule 6 to the extraction unit 14 when the actuator unit 112 is rotated in the first direction.

In a third embodiment of the capsule transfer mechanism 64, which is shown in FIG. 3, and is for use with the second or fourth embodiment code reading mechanism 54, the capsule transfer mechanism 64 comprises a movable capsule support and capsule support drive mechanism in the form of the capsule support channel 116 and the capsule actuation member 114, which is driven by the actuator unit 112 as discussed previously. In particular, the actuator unit 112 is operable to displace a capsule along the capsule support channel 116 to effect transfer to the capsule insertion channel 36. With the second embodiment code reading mechanism 54 displacement of the capsule includes code reading and transfer. With the fourth embodiment code reading mechanism 54, the capsule actuation member 114 is configured such that transfer precedes code reading i.e. the capsule actuation member 114 is configured to firstly engage the code reader 52 to effect code reading and thereafter to engage the capsule to effect its displacement and transfer.

A capsule processing unit 16 that comprises the combination of the second or fourth embodiment code reading mechanism 54 and third embodiment capsule transfer mechanism 64 is therefore operable to: read the code of the capsule 6 when the actuator unit 112 is translated in a first direction; to effect transfer of the capsule 6 to the extraction unit 14 when the actuator unit 112 is translated in the first direction. The said combination may also be adapted such that it is operable to: read the code of the capsule 6 when the actuator unit 112 is translated in a first direction; to effect transfer of the capsule 6 to the extraction unit 14 when the actuator unit 112 is translated in the second direction. For example, the capsule actuation member 114 extends around opposed edges of the capsule 6 such that: it may push and pull the capsule along the capsule support channel 116; a capsule can fall thought the capsule actuation member 114 when arranged over the capsule insertion channel 36. The adapted example also permits reading of the code by a reciprocating motion.

In a fourth embodiment (not shown) of the capsule transfer mechanism 64, the movable capsule support 66 is rotationally driven about the capsule axis of rotation to move between the capsule support and capsule transfer positions. More particularly, the movable capsule support 66 is formed of two parts both of which are rotatably mounted about the capsule axis to a support. The first part receiving a rotary motion and transmitting the rotary motion by a torque transmission means (which can comprise the torque transmission means of the first embodiment capsule transfer mechanism 64). To move from the capsule support position to the capsule transfer position: the first part and second part are separated in opposed directions about the capsule axis of rotation, thereby causing a capsule that is supported by the first and second part to be transmitted through a gap therebetween. A movable capsule support 66 with this arrangement is disclosed in more detail in WO 2014/056642, which is incorporated herein by reference. The said movable capsule support is driven by a capsule support drive mechanism, which comprises a drive train.

The fourth embodiment capsule transfer mechanism 64 may combined with the first or third embodiment code reading mechanism 54. The rotational movement of the moveable capsule support can be geared down by the drive train with respect to the capsule rotary drive member (or code reader rotary drive member) of the code reading mechanism 54 so that the code is read first as the moveable capsule support is gradually moved to the capsule transfer position. Such a combination has a similar operation with respect to the operation of the actuator unit as the second embodiment capsule transfer mechanism 64, that is: reading of the code of the capsule 6 when the actuator unit 112 is rotated in a first direction; transfer of the capsule 6 to the extraction unit 14 when the actuator unit 112 is rotated in the second direction.

The actuator unit 112 will now be considered: the actuator unit 112 may comprise a linear actuator, e.g. a solenoid, or rotary actuator, e.g. an electrically operated motor. Moreover, the actuator unit 112 may be adapted for either linear or rotary motion, for example: a linear actuator is adapted for rotary motion by means of a crank and a connecting rod that is driven by the linear actuator; a rotary actuator is adapted for linear motion by means of a connecting rod and a crank that is driven by the rotary actuator.

Capsule Detection System of Capsule Processing Unit

The capsule detection system will now be considered: the capsule detection system is operable to detect the presence, and optionally a type of capsule 6 on a capsule support, i.e.: in the first embodiment of the capsule transfer mechanism 64: the movable capsule support 66, in the third embodiment of the capsule transfer mechanism 64: the capsule support channel 116. For brevity the capsule detection system will be described in conjunction with the first embodiment of the capsule transfer mechanism 64, although it will be appreciated that a similar system may be combined with the second, third and fourth embodiment of the capsule transfer mechanism 64. The capsule detection system comprises one or more sensors to detect the presence of a capsule in proximity thereto. In a particular (but non-limiting) example the sensors are inductive sensors; however, they may comprise other sensors such as optical sensors. Moreover, code reader 52 may in itself operate as a sensor.

In a particular (but non-limiting) embodiment the capsule detection system comprises: a first sensor arrangement that is operable to detect the presence of a portion of the capsule, such as the flange, lid or body; a second sensor arrangement that is operable to detect a geometric property of a capsule, such as a particular length of a portion of the capsule, e.g. the body portion, wherein the geometric property may be used to identify a capsule type. Both the first and second sensor arrangements may comprise one or more sensors that are operatively connected to a component of the beverage preparation machine 4. In the instance of inductive sensors, a plurality of sensors of an arrangement may be connected in series.

Figure 10:
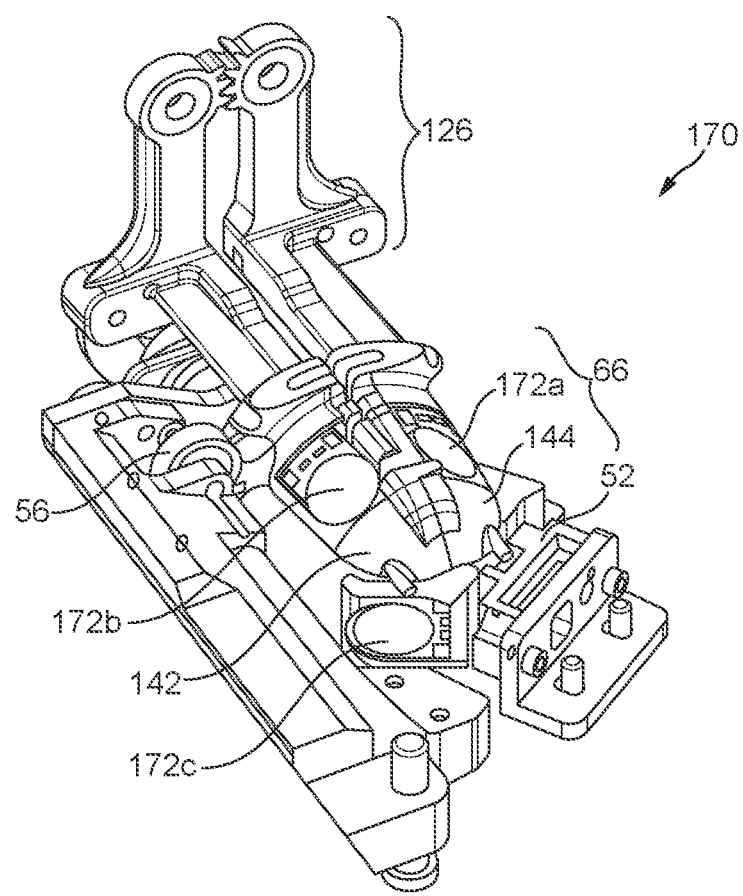
FIG. 10 is a perspective underside view of a capsule detection system of the beverage preparation machine according to FIG. 1.

With reference to FIG. 10 an example of such an embodiment of the capsule detection system 170 is shown, wherein the first sensor arrangement comprises sensors 172*a*, 172*b*, and the second sensor arrangement comprises a sensor 172*c*. Sensors 172*a* and 172*b* are arranged on the movable capsule support 66, and more particularly on the body support portions of the first part 142 and second part 144 thereof. In this way they are operable to detect the presence of a side-wall of the body of a capsule arranged on the movable capsule support 66. The sensor 172*c* is connected to the body 22 (e.g. via an intermediate member) of the beverage preparation machine 4 and arranged adjacent a base of the body of the capsule 6. In this way it is operable to detect the proximity of a base of the body of a capsule 6 thereto when the capsule 6 is arranged on the movable capsule support 66.

It is advantageous to have a plurality of sensors e.g. 172*a*, 172*b* to detect the presence of a portion of the capsule 6 (in this case the body) since the portion can become deformed such that its presence is not accurately detected by a single sensor.

In the illustrated example, the code reader 52 is arranged to read a code arranged on the base of the body of the capsule 6: the illustrated example may be adapted such that the code reader 52 also functions as the or part of the second sensor arrangement.

The first sensor arrangement can be used to determine whether a capsule is present, or more particularly when inductive sensors are used whether a metallic capsule is present; the second sensor arrangement can be used to determine a length of the body portion of a capsule or more particularly when inductive sensors are used the length of a metallic body portion, to determine different types of detected capsule. For an inductive sensor a capsule detection and identification program 176 a capsule processing program 174 of the processing unit 70 may comprise the following program code (or programmed logic): IF signal from first sensor arrangement indicates capsule THEN process signal from second sensor arrangement, ELSE no capsule (or non-metallic capsule) present; IF signal from second sensor arrangement indicates capsule THEN capsule of first type detected ELSE capsule of second type detected.

In response to the type and/or presence of capsule determined by the capsule detection and identification program 176 a capsule processing program 174 of the processing unit 70 may comprise program code (or programmed logic) to effect reading of a code of a capsule 6 using the code reading system 50 and/or transfer of the capsule to the extraction unit 14 using the capsule transfer mechanism 64. For example, the capsule processing program 174 may comprise the following program code (or programmed logic): IF first type capsule detected THEN read code using code reading system 50 AND IF code successfully read THEN transfer capsule to extraction unit 14 using the capsule transfer mechanism 64 ELSE IF second type capsule detected THEN transfer capsule to extraction unit 14 using capsule transfer mechanism 64 ELSE no capsule or unsuitable capsule detected.

Control System

Figure 11:
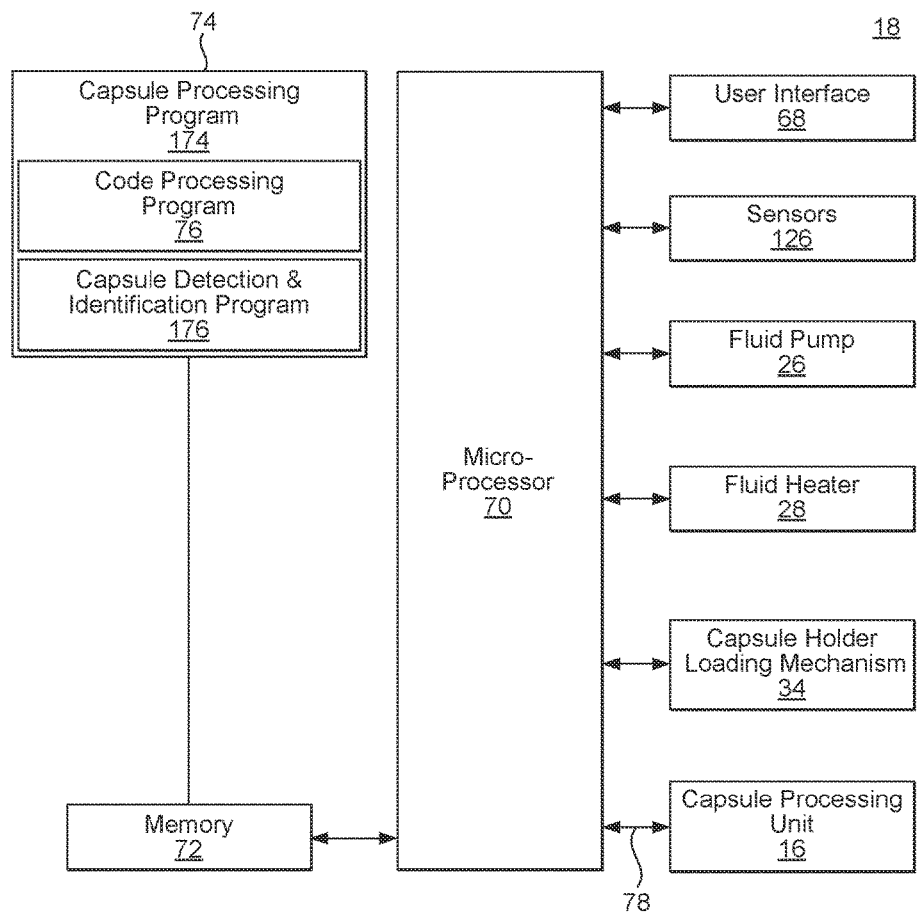
FIG. 11 is a block diagram of a control system of the beverage preparation machine according to FIG. 1.

With reference to FIGS. 1 and 11, the control system 18 will now be considered: the control system 18 is operable to control the other first level components to extract the one or more ingredients from the capsule 6. The control system 18 typically comprises at a second level of the beverage preparation machine 4: a user interface 68; a processing unit 70; a memory unit 72; one or more sensors 56, which are now discussed:

The user interface 68 is operable to receive commands from a user and to supply the commands to the processing unit 70 for execution. The commands may, for example, include an instruction to execute an extraction process and/or to adjust an operational parameter of the beverage preparation machine 4. The user interface 68 may also provide information to the user, for example, information relating to a status of the beverage preparation machine 4. To this end the user interface 68 may comprise a display, such as an LCD display, and/or selection means, such as selection keys or a capacitive touch screen of the display.

The or each sensor 56 is operable to provide a signal to the processing unit 70 for monitoring of the extraction process and/or a status of the beverage preparation machine 4. The sensors may for example comprise: temperature sensors; fluid flow rate sensors. In addition to the sensors 56, the aforementioned sensors 172 of the capsule detection system 170 also provide a signal to the processing unit 70.

The processing unit 70 comprises memory, input, and output system components arranged as an integrated circuit, typically as a microprocessor or a microcontroller. The processing unit 70 is operable to: receive an input, for example, commands from the user interface 68 and/or the signal of the sensors 56, 172; process the input according to program code (or programmed logic) stored on a memory unit 72; provide an output, which is generally an extraction process and may for example comprise the sequential operation of the: capsule processing unit 16; water supply 12; extraction unit 14.

The memory unit 72 is for storage of the program code and optionally data. To this end the memory unit typically comprises: a non-volatile memory e.g. EPROM, EEPROM or Flash for program code and operating parameter storage; volatile memory (RAM) for data storage. The memory unit may comprise separate and/or integrated (e.g. on a die of the semiconductor) memory. The processing unit 70 can be idealised as comprising a control unit and arithmetic logic unit or a plurality thereof, i.e. multiple processors.

The processing unit 70 may comprises other suitable integrated circuits, such as: an ASIC; a programmable logic device such as a PAL, CPLD, FPGA, PSoC; a system on a chip (SoC). For such devices, where appropriate, the aforementioned program code can be considered programmed logic or to additionally comprise programmed logic.

Programs Stored on Memory Unit of Control System

Referring to FIG. 11, the instructions stored on the memory unit 72 can be idealised as comprising a main beverage preparation program 74 that in itself comprises various other sub-programs. The beverage preparation program 74 comprises program code, which when executed by the processing unit 70, effects control by the processing unit 70 of the aforementioned first level components to extract an ingredient of the capsule therefrom. The beverage preparation program 74 may be executed in response to an input command from the user interface 68 and/or a single from a sensor, e.g. a signal form a sensor of the capsule detection system 170.

The beverage preparation program 74 when executed can effect control of the said components using extraction information encoded on the code capsule 6 and/or other information that may be stored as data on the memory unit 72 and/or input via the user interface 68.

To control the capsule processing unit 16 to process a capsule supplied by a user to the capsule support, the beverage preparation program 74 may be idealised as comprising a capsule processing program 174. The capsule processing program 174 comprises program code (or programmed logic) to; control the code reading system 50 to provide the code signal 78, i.e. such that the code reader 52 reads the code; control the capsule transfer mechanism 64 to transfer a capsule to the extraction unit 14. To detect and identify a type of capsule supplied by a user to a capsule support the capsule processing program 174 can be idealised as comprising a capsule detection and identification program 176. To decode the extraction information from the code signal information, the capsule processing program 174 can be idealised as comprising a code processing program 76.

Capsule of Beverage Preparation System

Figure 12:
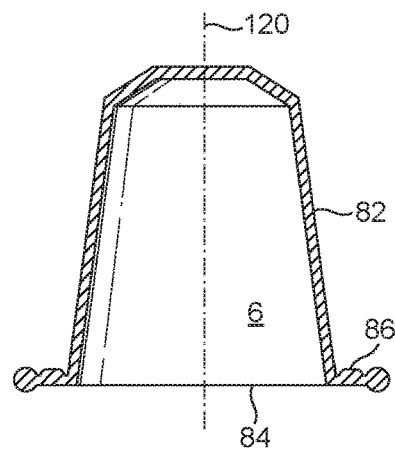
FIG. 12 is a side cross-sectional view of an embodiment of a capsule of the beverage preparation system according to FIG. 1.

The capsule 6 will be now discussed, and comprises: a body portion defining a cavity for the storage of a dosage of an ingredient to be extracted; a lid portion for closing the cavity; a flange portion for connecting the body portion and flange portion, the flange portion being arranged distal a base of the cavity. The body portion may comprise various shapes, such as a disk, conical or rectangular cross-sectioned shaped. The capsule may be formed from various materials, such as metal or plastic or a combination thereof. In general the material is selected such that it is: food-safe; it can withstand the pressure/temperature of the extraction process; it is perforable to enable insertion of the injector 40 of the injection head 30; it is rupturable for delivery of the extracted ingredient to the outlet 48 of the extraction wall 46. Accordingly, it will be appreciated that the capsule 6 may take various forms, two examples of which are provided in the following:

FIG. 12 shows a side cross-sectional view of a first example of a capsule 6 that comprises: a body portion 82, which comprises a frusto-conically shaped cavity for receiving the dosage of the ingredient to be extracted; a lid portion 84 for closing the cavity of the body portion; a flange portion 86 for connection of the body portion 82 and the lid portion 84.

Figure 13:
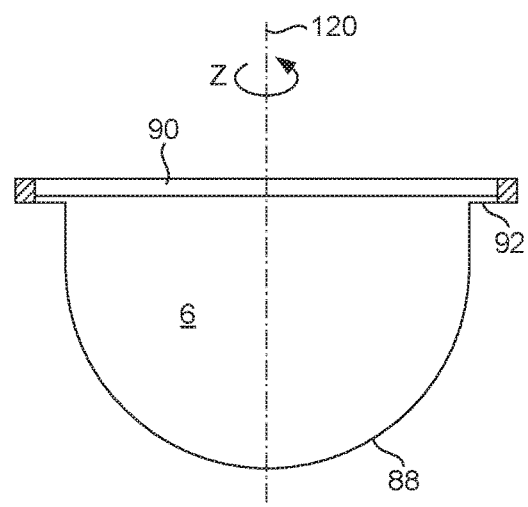
FIG. 13 is a side cross-sectional view of an embodiment of an alternative capsule of the beverage preparation system according to FIG. 1.

FIG. 13 shows a side cross-sectional view of a second example of a capsule 6 that comprises: a body portion 88, which comprises a hemi-spherically shaped cavity for receiving the dosage of the ingredient to be extracted; a lid portion 90 for closing the cavity of the body portion; a flange portion 92 for connection of the body portion 88 and the lid portion 90.

In certain non-limiting embodiments, the capsule 6 is shaped such that it is substantially rotationally symmetric about a capsule axis of rotation 120 which is extends generally orthogonal to a plane on which the flange portion, 86, 92 is located.

Code of Capsule

A code 94 of a capsule 6 will now be discussed: initially the general arrangement of the code on the capsule is discussed, wherein code is arranged on the capsule 6 such that it can be read by the code reader 52 when there is relative movement between the capsule 6 and code reader 52.

Figure 14:
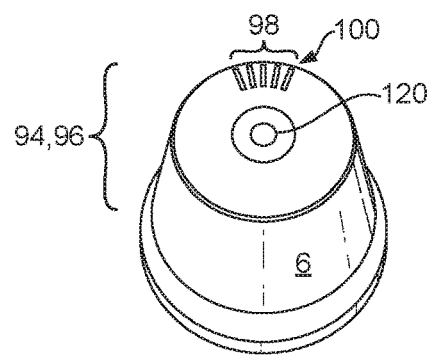
FIG. 14 is a perspective view of the capsule of FIG. 12 showing a code of the capsule.

The code when arranged for reading by the first or third embodiment code reading mechanisms 54 is arranged about a rotational axis of the capsule. Referring to FIG. 14, and such an example of the code 94 is shown, wherein the code 94 is arranged on the base of the cavity of the body portion 82, 88 of the capsule 6 and is arranged circumferentially about the capsule axis of rotation 120 such that the code 94 can be read during rotational of the capsule 6 about the capsule axis of rotation 120. In other examples code arrangements which are compatible with the first or third embodiment code reading mechanisms 54, code can be arranged on other portions of the capsule, such as the flange or lid portions 84, 92.

The code when arranged for reading by the second or fourth embodiment code reading mechanisms 54 is arranged aligned with an axis of the capsule. For example the code may be arranged on the body portion 82, 88 of the capsule and aligned with the axis of rotation 120.

The code 94 may be repeated a one or a plurality of times on the capsule, for example 2-6 times, with each repetition of the code 94 being referred to herein in as a code repetition. In the case of a single code repetition, the said repetition may be read a single time, or in a particular (but non-limiting) example the single repetition code 94 is read a plurality of times and the processing unit 70 is operable to perform a step of checking the reads of the code correspond to each other. Alternatively, in an example wherein the code comprises a plurality of code repetitions, each code repetition can be read once or a plurality of times and the processing unit 70 is operable to perform a step of checking the reads of the code correspond to each other.

The general formation of the code will now be discussed: the code is preferably (but not by way of limitation) formed of a series of markers 96. The markers 96 are of a shape that permits identification of a marker 96 (in comparison to the absence of a marker 96) in the code signal 78 provided by the code reader 52. Generally all the markers 96 comprise substantially the same shape such that a characteristic feature (e.g. a pulse) is provided in the code signal 78 when they are read by the code reader 52. In a particular (but non-limiting) example the markers 96 are bar shaped; however, they may be other shapes such as square or circular. In the example of FIG. 14 the markers 96 are bar shaped and are arranged radially with respect to the capsule axis of rotation 120.

The markers 96 may be formed on the capsule 6 by various means, for example, by embossing (e.g. for use with an inductive code reader 52) or printing (e.g. for use with an optical code reader 52). In the example of FIG. 14 the markers 96 are formed by embossing on a metal portion of the body portion 82, 88 of the capsule 14. It will be appreciated that the embossing may comprise an indent that extends normal to the surface of the capsule in either direction (i.e. the markers 96 can be defined by the absence or presence of the indent). In a further example, the markers 96 may be formed on a non-metallic portion of a capsule, for example a plastic portion, by the application of metal layers thereto, whereby the absence or presence of a metal layer defines a marker. In a yet further example the markers 96 may be formed by ink printing, whereby the absence or presence of a print defines a marker.

The dimensions of the markers 96 vary with the dimensions of the capsule 6 and the resolution of the reading head of the code reader 52. However, in a particular (but non-limiting) example, the markers 96 in bar form have the following dimensions: 0.6 mm-0.2 mm in depth, with a particular (but non-limiting) depth of 0.4 mm; 1.5 mm—the radii of the capsule in length, with a particular (but non-limiting) length of 2 mm; 10 mm-0.4 mm in width, with a particular (but non-limiting) width of 0.7 mm. The distance between markers 96 varies as discussed following; however, it is generally within the range of 2-0.5 mm. In the case of circumferentially arranged markers 96 the distance between the markers 96 may be defined as the maximum, minimum or average circumferential distance.

The markers 96 are arranged to encode the extraction information. A plurality of markers 96 may encode a data 98, whereby each adjacent marker has a specific spacing as a variable to at least partially encode extraction information therein. An example of such a code is disclosed in PCT/EP14/055510, which is incorporated herein by reference.

In further embodiments the code 94 may comprise a barcode or the optically readable code disclosed in EP 2594171 A1, which is incorporated herein by reference.

The extraction information encoded by the code relates to the capsule and/or operational parameters of the machine that may be used during the extraction process. For example, the extraction information may encode one or more of the following: angular velocity/acceleration (for centrifugally operated extraction units); water temperature (at capsule inlet and/or machine outlet); water mass/volumetric flow rate; water volume; a sequence of extraction operations e.g. pre-wetting time; capsule parameters (volume, type, capsule identifier, expiry date), which may for example be used to monitor capsule consumption for the purpose of capsule re-ordering.

LIST OF REFERENCES

2 Beverage preparation system
4 Beverage preparation machine
  10 Housing
  20 Base
  22 Body
  12 Fluid supply
  24 Reservoir
  26 Fluid pump
  28 Fluid heater
  14 Extraction unit
  30 Injection head
    40 Injector
  32 Capsule holder
    42 Cavity
      44 Cavity Base
    46 Extraction wall
      48 Outlet
    34 Capsule holder loading mechanism
  36 Capsule insertion channel
  38 Capsule Ejection channel
  16 Capsule processing unit
  50 Code reading system
    52 Code reader
      78 Code signal
    54 Code reading mechanism
      62 Read cycle sensor
      Embodiment 1
      58 Capsule rotary drive member
      60 Drive train
      Embodiment 2
      114 Capsule actuation member
      116 Capsule support channel
      Embodiment 3
      178 Code reader rotary drive member
  64 Capsule transfer mechanism
    66 Movable capsule support
      142 First part
      144 Second part
    124 Capsule support drive mechanism
      126 Capsule support actuation member
        128 First arm
          Proximal end (Movable capsule support)
          Distal end (torque transmission means)
        130 Second arm
          Proximal end (Movable capsule support)
          Distal end (torque transmission means)
        132 Torque transmission means
      152 Biasing member
      154 Guide member
    134 actuation member drive mechanism
      146 Drive train
      148 Gears
      150 One-way clutch
      136 Connecting member
      138 Crank
      166 Position sensor
  156 Movable support system
    158 Movable support
    160 Movable support drive mechanism
      162 Cam engagement member
      164 Cam biasing member
      168 Cam
  112 Actuator unit
  170 Capsule detection system
    172 Sensors
  18 Control system
    68 User interface
    70 Processing unit
    72 Memory unit
      74 Beverage preparation program
        174 Capsule processing program
        76 Code processing program
        176 Capsule detection and identification program
      56 Sensors (temperature, water level, injection head position)
6 Capsule
  120 Capsule axis of rotation
  Example 1
    82 Body portion
    94 Code
      96 Markers
      98 Data
    84 Lid portion
    86 Flange portion
  Example 2
    88 Body portion
    90 Lid portion
    92 Flange portion
8 Receptacle

The invention claimed is:

1. A capsule processing unit of a beverage preparation machine which comprises an extraction unit to extract an ingredient of a beverage from a capsule during preparation of the beverage, the capsule processing unit comprising:
  a code reading system comprising a code reader and a code reading mechanism, the code reading mechanism configured to effect reading of a code of a capsule by the code reader by imparting relative rotational movement between a code reader and capsule, whereby the code is read during rotation of the capsule;
  a capsule transfer mechanism configured to effect transfer of a capsule to the extraction unit, wherein the capsule transfer mechanism comprises a movable capsule support which is actuated between a capsule support position and a capsule transfer position by means of a capsule support drive mechanism, wherein the capsule support drive mechanism comprises:

a capsule support actuation member operatively connected to the movable capsule support; and
an actuation member drive mechanism operatively connected to the capsule support actuation member, the actuation member drive mechanism being operable to actuate the capsule support actuation member to move the movable capsule support between the capsule support position and the capsule transfer position, and wherein the actuation member drive mechanism comprises:
a drive train having a one-way clutch, the drive train being operatively linked to the actuation unit;
a crank;
wherein the one-way clutch of the drive train is configured to transfer rotary motion to the crank when the actuation unit supplies rotary motion in a second direction only; and
a connecting member being operatively connected to the actuation member and crank so that rotation of the crank effects movement of the movable capsule support between the capsule support position and capsule transfer position; and
a single actuator unit actuating the code reading system to read the code and the capsule transfer mechanism to effect transfer of the capsule.

2. The capsule processing unit according to claim 1, wherein the code reading mechanism and capsule transfer mechanism are configured to receive movement from the actuator unit in a first direction to effect said reading of the code, and configured to receive movement from the actuator unit in a second direction to effect said transfer of the capsule.

3. The capsule processing unit according to claim 1, wherein the actuator unit actuates the code reading mechanism and capsule transfer mechanism by rotary motion.

4. The capsule processing unit according to claim 1, wherein the code reading mechanism is configured to effect reading of the code by imparting relative rotational movement between the code reader and capsule about a capsule axis of rotation.

5. The capsule processing unit according to claim 4, wherein the code reading mechanism comprises a capsule rotary drive member, the capsule rotary drive member being operable to receive rotary motion from the actuator unit and being operable to impart said rotary motion to a capsule.

6. The capsule processing unit according to claim 1, wherein the capsule support actuation member comprises a first arm that at a proximal end is operatively connected to the movable capsule support and at a distal end is pivotally connected to a body of the capsule processing unit.

7. The capsule processing unit according to claim 6, wherein the capsule support actuation member comprises a second arm that at a proximal end is connected to a second part of the movable capsule support and at a distal end is pivotally connected to the body, and the proximal end of the first arm is connected to a first part of the movable capsule support, the first and second arm being operatively linked by a torque transmission means, which is configured to transmit corresponding rotary motion between the arms, the first part being movable relative the second part by the capsule support actuation member to implement the capsule support and transfer positions.

8. The capsule processing unit according to claim 1, further comprising a capsule detection system comprising a first arrangement of one or more sensors arranged to detect the presence of a capsule on the movable capsule support and a second arrangement of one or more sensors arranged to detect a geometric property of a portion of the capsule to determine a type of the capsule.

9. A beverage preparation machine comprising:
an extraction unit operable to extract an ingredient of the beverage from a capsule during preparation of the beverage;
a fluid supply operable to supply fluid to the extraction unit; and
a capsule processing unit comprising:
a code reading system comprising a code reader and a code reading mechanism, the code reading mechanism configured to effect reading of a code of a capsule by the code reader by imparting relative rotational movement between a code reader and capsule, whereby the code is read during rotation of the capsule;
a capsule transfer mechanism configured to effect transfer of a capsule to the extraction unit, wherein the capsule transfer mechanism comprises a movable capsule support which is actuated between a capsule support position and a capsule transfer position by means of a capsule support drive mechanism, wherein the capsule support drive mechanism comprises:
a capsule support actuation member operatively connected to the movable capsule support; and
an actuation member drive mechanism operatively connected to the capsule support actuation member, the actuation member drive mechanism being operable to actuate the capsule support actuation member to move the movable capsule support between the capsule support position and the capsule transfer position, and wherein the actuation member drive mechanism comprises:
a drive train having a one-way clutch, the drive train being operatively linked to the actuation unit;
a crank;
wherein the one-way clutch of the drive train is configured to transfer rotary motion to the crank when the actuation unit supplies rotary motion in a second direction only; and
a connecting member being operatively connected to the actuation member and crank so that rotation of the crank effects movement of the movable capsule support between the capsule support position and capsule transfer position; and
a single actuator unit actuating the code reading system to read the code and the capsule transfer mechanism to effect transfer of the capsule.

10. The beverage preparation machine according to claim 9, further comprising a control system being operable to control the actuator unit to actuate the code reading system to read the code and to actuate the capsule transfer mechanism to effect transfer of the capsule, wherein the control system is operable to control the actuator unit to move in a first direction to actuate the code reading system to read the code and to move in a second direction to actuate the capsule transfer mechanism to effect transfer of the capsule.

11. The beverage preparation machine according to claim 9, wherein the code reader is in communication with a processing unit by means of a code signal, the processing unit operable to determine extraction information from the code signal, the processing unit further operable to control the fluid supply and/or the extraction unit using at least part of the determined extraction information and/or at least part of the determined extraction information is stored on the memory unit for monitoring of capsule consumption and/or usage of the beverage preparation machine.

12. A method of processing a capsule with the capsule processing unit of a beverage preparation machine which comprises an extraction unit to extract an ingredient of a beverage from the capsule during preparation of the beverage, the method comprising:

obtaining the capsule processing unit comprising:
- a code reading system comprising a code reader and a code reading mechanism, the code reading mechanism configured to effect reading of a code of a capsule by the code reader by imparting relative rotational movement between a code reader and capsule, whereby the code is read during rotation of the capsule;
- a capsule transfer mechanism configured to effect transfer of a capsule to the extraction unit, wherein the capsule transfer mechanism comprises a movable capsule support which is actuated between a capsule support position and a capsule transfer position by means of a capsule support drive mechanism, wherein the capsule support drive mechanism comprises:
  - a capsule support actuation member operatively connected to the movable capsule support; and
  - an actuation member drive mechanism operatively connected to the capsule support actuation member, the actuation member drive mechanism being operable to actuate the capsule support actuation member to move the movable capsule support between the capsule support position and the capsule transfer position, and wherein the actuation member drive mechanism comprises:
    - a drive train having a one-way clutch, the drive train being operatively linked to the actuation unit;
    - a crank;
    - wherein the one-way clutch of the drive train is configured to transfer rotary motion to the crank when the actuation unit supplies rotary motion in a second direction only; and
    - a connecting member being operatively connected to the actuation member and crank so that rotation of the crank effects movement of the movable capsule support between the capsule support position and capsule transfer position; and
- a single actuator unit actuating the code reading system to read the code and the capsule transfer mechanism to effect transfer of the capsule;

actuating with the actuator unit the code reading system to read a code of a capsule; and actuating with the actuator unit the capsule transfer mechanism to transfer the capsule to the extraction unit.

\* \* \* \* \*

UNITED STATES PATENT AND TRADEMARK OFFICE
CERTIFICATE OF CORRECTION

PATENT NO. : 10,034,573 B2
APPLICATION NO. : 15/315649
DATED : July 31, 2018
INVENTOR(S) : Jean-Marc Flick, Antoine Ryser and Milena Partzsch Page 1 of 1

It is certified that error appears in the above-identified patent and that said Letters Patent is hereby corrected as shown below:

On the Title Page

Under (72) Inventors: Delete "Partzch," and replace with -- Partzsch, --

Signed and Sealed this
Twenty-fifth Day of September, 2018

Andrei Iancu
*Director of the United States Patent and Trademark Office*